3,519,684
PREPARATION OF AROMATIC DISUBSTITUTED
CARBOXYLIC ACIDS
Enrique Roberto Witt, P.O. Box 2768, Corpus Christi,
Tex. 78403; Kwang Yuen Zee-Cheng, 633 E. 72nd
St., Kansas City, Mo. 64131; and James Patrick
Cave, P.O. Box 2768, Corpus Christi, Tex. 78403
No Drawing. Filed Dec. 27, 1966, Ser. No. 604,600
Int. Cl. C07c 63/02
U.S. Cl. 260—524                                    4 Claims

ABSTRACT OF THE DISCLOSURE

In producing an aromatic dicarboxylic acid, e.g. terephthalic acid, by oxidizing an alkyl disubstituted aromatic compound, e.g. p-xylene, with molecular oxygen in the presence of a cobalt catalyst in a hydrocarbon oxidation reaction zone, the cobalt catalyst is activated with peracetic acid in a separate zone at a relatively low temperature, i.e. 0° C. to 40° C. The resulting activated catalyst solution is then introduced into the hydrocarbon oxidation reaction zone. Efficiency of utilization of the activating agent is greatly improved as compared with introducing it directly into the hydrocarbon oxidation zone at hydrocarbon oxidation reaction temperature.

---

This invention relates to the preparation of aromatic dicarboxylic acids. More particularly it relates to a process for making aromatic dicarboxylic acids by the catalytic liquid phase oxidation of aromatic compounds.

Aromatic dicarboxylic acids and particularly terephthalic acid are of great commercial importance in the manufacture of high molecular weight resins. An increasing amount of terephthalic acid is being used in the direct polymerization reaction of terephthalic acid to film-forming and fiber-forming polyesters.

The prior art is replete with proposed processes for the catalytic liquid phase oxidation of alkyl disubstituted aromatic compounds in the presence of a solvent by air or oxygen using metallic catalysts with the addition of suitable catalyst activators. For example in U.S. Pat. 2,245,528 Loder describes a process of oxidizing aromatic compounds such as p-xylene in the liquid phase in the presence of oxygen, an oxidation catalyst, and an oxidation initiator. Oxidation initiators mentioned include peroxides, peracids, aldehydes, ketones, ethers, and olefins. The process as described by Loder had certain deficiencies, especially those of low conversion and long reaction periods. A number of later patents have issued using a variety of oxidation catalyst activators for the oxidation of p-xylene to terephthalic acid in a single step with a relatively high degree of conversion. For example in U.S. Pats. Nos. 2,853,514 and 3,036,122, methyl ethyl ketone is the preferred activator. In British Pat. 1,005,814, acetaldehyde is the preferred activator. Bromine and bromine compounds have also been used as catalyst activators for the air oxidation of p-xylene to terephthalic acid.

In Canadian Pat. 705,442, assigned to the present assignee, a process is described for the oxidation of p-xylene to terephthalic acid which comprises continuously passing a stream of oxygen containing vaporous peracetic acid into contact with a liquid comprising p-xylene and a cobalt oxidation catalyst in a suitable solvent such as acetic acid. A disadvantage in the above described process is the amount of peracetic acid required to maintain the catalyst solution in an activated state.

Accordingly, it is the main object of this invention to provide a method for the catalytic oxidation of alkyl disubstituted aromatic compounds to form aromatic dicarboxylic acids by a process which comprises activating the oxidation catalyst by treating said catalyst with peracetic acid to oxidize it from a lower to a higher valence state.

It is a further object to carry out the process of this invention by activating the catalyst externally to the reactor.

It is a further object of this invention to carry out the catalytic liquid phase oxidation of p-xylene to terephthalic acid at high rates with high initiator efficiencies using a relatively high cobalt catalyst concentration.

The above objects are carried out by treating a catalyst solution comprising a cobalt salt dissolved in a lower aliphatic monocarboxylic acid having from 1 to 8 carbon atoms with peracetic acid at relatively low temperatures, e.g. about 0° C. to 40° C., to form an activated catalyst liquid, introducing the active catalyst solution into a separate oxidation reaction zone, introducing simultaneously an alkyl disubstituted benzene and an oxygen-containing gas into the oxidation reaction zone containing the catalyst solution, and maintaining the reaction zone at a temperature in the range of 120–150° C. The process of this invention depends upon a novel combination of reaction conditions which must be satisfied in order to attain significantly high conversion and yield of desired product.

Alkyl disubstituted aromatic compounds having one or more methyl groups substituted in the aromatic nucleus are applicable in the process of this invention. Preferably the alkyl radicals should contain 1 to 4 carbon atoms. The invention is particularly useful when the alkyl substituents are in the meta or para position, especially the para position. Exemplary of compounds applicable in the process of this invention are xylenes, methylethylbenzenes, cymenes, and others. Preferably the alkyl disubstituted aromatic compound is p-xylene containing no more than a relatively minor amount of isomeric xylenes and other impurities.

Disubstituted aromatics in which both substituent groups have at least two carbon atoms can also be oxidized, but the oxidation of such compounds does not normally require special activating techniques such as that of the present invention.

The oxidation catalyst used in the process of this invention is preferably a cobalt salt of a carboxylic acid, generally cobalt acetate. Any cobalt salt which is soluble in acetic acid in an amount sufficient to form the desired cobalt concentration in the solvent used is satisfactory. Preferably, however, cobalt acetate is used, though salts of the other lower aliphatic monocarboxylic acids may be used such as propionate, butyrate, and formate. The cobalt catalyst is converted to active cobalt $Co^{+3}$ by oxidation with peracetic acid. This activation is preferably carried out in a vessel other than the reactor so that the initiator itself does not come in contact with the compound to be oxidized, in most cases xylene. It is not essential that all of the cobalt be converted to $Co^{+3}$, but it is preferable that substantially all of it be so converted. Any which is not converted to $Co^{+3}$ is not active in the hydrocarbon oxidation process and essentially constitutes an inert recycle in the process. It is desired that the solution contain at least about 0.5 weight percent of the cobalt compound, calculated as cobalt, for effective performance in the oxidation reaction. There is no upper limit to the feasible concentration, but a practical limit of approximately 2 to 3 weight percent is set by the fact that this is the approximate concentration of saturated cobalt carboxylates in lower carboxylic acids at the temperatures preferred for the activation reaction.

The process of this invention is preferably carried out in a solvent which is substantially inert under the conditions of the activation and hydrocarbon oxidation reactions. Preferably the solvent is a lower alkyl monocarboxylic acid having from 2 to 8 carbon atoms, and most preferably acetic acid.

It is important in the process of this invention that the compound to be oxidized not be mixed with the activated catalyst solution prior to actual contact of the catalyst solution with the compound to be oxidized in the reaction zone or, alternatively, immediately prior to contacting the catalyst solution in the reaction zone. This is necessary because, for example, xylene in contact with an activated cobalt catalyst solution in acetic acid reduces the $Co^{+3}$ to $Co^{+2}$ prior to entry into the reaction zone and lowers the effectiveness of the catalyst in the reaction zone.

Briefly the process with reference to the oxidation of p-xylene to predominantly terephthalic acid can be described as follows:

A cobalt acetate solution is activated by adding peracetic acid (typically in acetic acid solution) to a solution of cobalt acetic acid and acetic acid. The stoichiometry of the activation is:

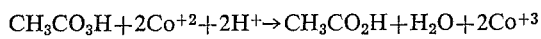

$$CH_3CO_3H + 2Co^{+2} + 2H^+ \rightarrow CH_3CO_2H + H_2O + 2Co^{+3}$$

A portion of the catalyst solution is then introduced into the hydrocarbon oxidation reaction zone and heated to a suitable reaction temperature. The remainder of the catalyst solution, along with xylene and molecular oxygen, is fed simultaneously to the reaction zone. After a suitable reaction time the reaction mass is removed, terephthalic acid is separated from the resulting reaction mixture, and the mixture is recycled to the activation zone. It is preferable to distill water produced during the reaction and unreacted xylene overhead in order to avoid the degradation of $Co^{+3}$ to $Co^{+2}$ as much as possible.

The proportion of ingredients in the oxidation reaction depends to some extent on the particular reactants employed and the conditions under which the process is carried out. With regard to the catalyst concentration, best results are obtained by employing from 0.5 to 2.5% by weight of cobalt based on reagents charged, preferably about 1.7 weight percent cobalt based on reagents charged. Lower concentrations can be used but at the expense of reaction rate. Higher concentrations are difficult to use because of the limited solubility of the cobalt salt.

The amount of the dialkyl substituted aromatic compounds present at the start of the reaction is preferably about 10 to 30 percent by weight of the total reaction mixture, expressed as xylene, and preferably 15 to 25 weight percent. It has been found that higher aromatic concentrations show appreciably higher oxidation rates. When carrying out the operation in a continuous manner it is best to maintain 15 to 30 weight percent of total aromatic compounds expressed as p-xylene to obtain optimum yields and conversions. During continuous operation the xylene content of the reactants will actually be small; most of the aromatics will actually be present as toluic acid, carboxybenzaldehyde, etc. The carboxylic acid (e.g. acetic acid) concentration in the reaction mixture is advantageously maintained at approximately 60 to 80 wt. percent.

Oxygen can be supplied to the reaction process as air, pure oxygen, or any other suitable gas containing molecular oxygen. Air is entirely suitable, and is preferred because of its cheapness.

This process can be carried out at subatmospheric, atmospheric, or superatmospheric pressure. Preferably a pressure ranging from 0 to 1000 p.s.i.g. and more preferably from 100 to 500 p.s.i.g. is used. Pressures up to 500 p.s.i.g. utilizing p-xylene as reactant have been found to give commercially useful reaction rates.

One problem encountered in the operation of the process is the maintenance of the proper content of water in the reaction mixture. A large amount of water has a distinct adverse effect on the reaction rate. Preferably, nearly anhydrous conditions are employed, although a water content of up to about 10% can be tolerated and a maximum water content of not greater than 5% is preferred. Water formed during the reaction is preferably removed from the reaction system by distillation, most preferably by vacuum stripping using a pressure of about 100 millimeters HgA. Xylene and water form a binary azeotrope and both can be removed at the same time. Thus, the recycle mixture freed of water and xylene can be reactivated with peracetic acid without any serious degradation of the $Co^{+3}$ catalyst due to excessive amounts of water and xylene present in the reaction mixture.

The time of reaction is dependent upon a number of variables such as the particular alkyl substituted aromatic compounds used, catalyst, temperature, rate of addition of oxygen, amount of water present, etc. In the conversion of p-xylene to terephthalic acid by the instant process, it has been found that terephthalic acid could be produced at 14 to 24 pounds per pound of peracetic acid at 40 to 60% conversion per pass and 90 to 95% yield based on p-xylene used. As distinguished from the earlier process mentioned before which utilizes vapors of peracetic acid fed simultaneously with the oxygen to the p-xylene catalyst mixture, utilization of the peracetic initiator by the instant process results in considerable reduction in raw material cost. Expressing the utilization of initiator by the ratio of pounds of terephthalic acid produced per pound of peracetic acid, the highest value obtained by the earlier process was about 2.6. By the instant process ratios of 10 to 20 can easily be attained.

The temperature at which the instant oxidation process is carried out is very important to effect optimum oxidation. The reaction is preferably carried out at temperatures ranging from 130 to 140° C. Below 130° C. the oxidation becomes very sluggish, while above 140° C. the catalyst precipitates irreversibly and the system becomes totally inactive.

The process of this invention can be carried out batchwise or by continuous process, the continuous process being preferred. During the course of oxidation it has also been found that a high $Co^{+3}$ concentration is essential for maintaining a rapid oxidation rate level. When the ratio of $Co^{+3}$ to total cobalt falls below about 0.2 the reaction becomes extremely slow. Thus it is preferable to maintain a ratio of $Co^{+3}$ to total cobalt of at least 0.3 and preferably greater than 0.4.

All of the examples below were carried out in a four liter stainless steel reactor. The air was introduced at the bottom of the reactor at the confluence of two liquid feed lines, one for the active catalyst solution and one for p-xylene. Activation of the catalyst took place in an agitated vessel where the cobalt catalyst dissolved in acetic acid was contacted with peracetic acid at 20 to 30° C. The heat of reaction was removed by internal cooling coils. The activated catalyst was then fed to a stirred hydrocarbon oxidation reactor along with p-xylene and air where the reaction took place at a temperature ranging from 130 to 140° C. Above 140° C. the cobalt catalyst precipitated from the solvent and became inactive. The heat of reaction was removed by internal cooling coils and volatile components were condensed from the vent gas in an overhead condensing system and returned to the reactor. Terephthalic acid, being very insoluble in the acetic acid solvent, precipitated and was removed continuously from the reactor as a slurry to a low pressure (30 to 40 p.s.i.g.) degassing vessel for removal of dissolved gases prior to filtering. The crude terephthalic acid mixture was separated from the catalyst solution by filtration apparatus operated at reactor temperatures to maintain the solubility of terephthalic acid intermediates such as p-toluic acid as high as possible. The filtered catalyst solution was then fed to a vacuum distillation tower for removal of water of reaction and unreacted xylene which interferes with catalyst reactivation. The recovered xylene is separated from the overhead water phase in a decanter and returned to the reactor. The stripped catalyst solution, which contains some p-toluic acid for small amounts of other intermediates, is recycled to the catalyst activator vessel, contacted with peracetic acid, and returned to the oxidation reactor.

Under the above conditions, the desired oxidation occurs very rapidly giving excellent yield and conversion to the desired aromatic carboxylic acid product in a short amount of time.

The following specific examples provide illustrative embodiments of the oxidation of alkyl substituted aromatic compounds to form to corresponding aromatic carboxylic acids in accordance with this inevntion. They are intended to be illustrative of the invention only and not limiting.

EXAMPLE I

In the series of experiments noted in Table I p-xylene was oxidized with air in the presence of a cobalt catalyst at 90 to 95 p.s.i.g. and 130 to 140° C. in an acetic acid solvent in a 4 liter stainless steel reactor. Catalyst activation and catalyst reagent feeding procedures were changed showing the effect on the oxidation rate, terephthalic acid yield, and terephthalic/peracetic ratio.

actor not in accordance with the invention—was largely decomposed before being able to promote reaction initiation.

In Run No. 3, the xylene-peracetic ratio was increased to 10 to 1 (molar basis). Two-fifths of the peracetic acid was used for catalyst activation in a separate vessel and the remainder fed with the xylene. Terephthalic acid yield and the terephthalic acid/peracetic acid ratio were again not so high as in Run 4 below, for the same reasons as set forth in conjunction with the discussion of Run 2 above. The initiator added to the catalyst outside the reactor was effective, but the fraction so added was not great enough for effective initiation of the oxidation of the relatively large quantity of feedstock employed in the run.

In Run No. 4, the xylene:peracetic acid ratio of 10 to 1 was preserved but all of the peracetic acid was used for catalyst activation in a separate vessel. Half of the catalyst solution was fed to the reactor followed by xylene and then the remainder of the catalyst was added. The yield of terephthalic acid (44.5%) was greater than

TABLE I

| | Run Number | | | |
|---|---|---|---|---|
| | 1 | 2 | 3 | 4 |
| Reaction Sequence | All reagents charged and activated in reactor | Catalyst activated separately with 0.1 mole AcOOH; xylene fed with 0.2 mole AcOOH; 0.2 mole AcOOH fed | Catalyst activated separately with 0.1 mole AcOOH; xlyene +0.15 mole AcOOH fed to reactor | Catalyst activated separately with 0.25 mole AcOOH and one-half fed to reactor; xylene fed; rest of catalyst fed |
| Reagents: | | | | |
| Acetic acid, g | 1,250 | 1,250 | 1,250 | 1,250 |
| Co(ACO)$_3$·4 H$_2$O, g | 125 | 125 | 125 | 125 |
| p-Xylene, g | 265 | 265 | 265 | 265 |
| AcOOH (27.9% in AcOH), g | 136 | 136 | 68 | 68 |
| Peracetic acid, g | 38 | 38 | 19 | 19 |
| Peracetic:xylene ratio (moles) | 1:5 | 1:5 | 1:10 | 1:10 |
| Reaction Conditions: | | | | |
| Temperature, °C | 130-135 | 130-140 | 130-140 | 135-140 |
| Pressure, p.s.i.g | 90-100 | 95-100 | 95-100 | 95-100 |
| Reaction time, hours | 5 | 5 | 5 | 5 |
| Air volume vented, cu. ft | 67.5 | 73.1 | 84.9 | 86.0 |
| Average flow vented, cu. ft./min | 0.225 | 0.244 | 0.283 | 0.287 |
| Total O$_2$ consumed, g | 159.4 | 209.7 | 158.0 | 163.0 |
| Theoretical O$_2$, g | 240 | 240 | 240 | 240 |
| Completion, percent | 67 | 86 | 66 | 68 |
| Rate of oxidation, mole O$_2$ min.$^{-1}$ 1$^{-1}$×10$^{-4}$: | | | | |
| Active stage | 240 | (a) 330; (b) 254 | 235 | 400 |
| After deactivation | 22 | 31 | 18 | 25 |
| Products: | | | | |
| Crude terephthalic, g | 142.5 | 116 | 74 | 213.6 |
| Acid number, mg. KOH/g | 659.2 | 655 | 585 | 634.5 |
| Calculated purity, percent | 93.4 | 92.4 | 65 | 85.4 |
| Actual terephthalic, g | 138.8 | 121.9 | 48 | 182.1 |
| Yield of terephthalic, percent | 34.3 | 29.6 | 11 | 44.5 |
| Crude p-toluic, g | 204.8 | 226 | 255 | 101 |
| Acid number, mg. KOH/g | 360 | 429 | 364.6 | 419 |
| Actual p-toluic, g | 198.8 | 207.4 | 274.9 | 125.6 |
| Yield of p-toluic, percent | 59.8 | 61.7 | 80.6 | 38.1 |
| Terephthalaldehydic, g | 9.7 | 12.7 | 6.1 | 6.5 |
| p-Xylene recovered, g | 4.9 | 1.4 | | 7.5 |
| Yield oxidation products, percent | 96.5 | 94.8 | 93.0 | 85 |
| Weight ratio, terephthalic:peracetic acid | 3.63:1 | 3.20:1 | 2.55:1 | 9.50:1 |

(a) During xylene addition.
(b) During peracetic addition.

In Run No. 1 the entire reactor charge was activated at room temperature in the reactor, then heated to 130 to 140° C. and oxidized. A considerable amount of initiator was lost in the run. The ratio of terephthalic acid to peracetic acid was 3.6 to 1, however, equal to the best obtained by the process described in Canadian Pat. 705,442.

In Run No. 2 the catalyst was activated with ⅕ of the total peracetic acid used in a separate glass vessel at room temperature. The active catalyst was charged to the reactor and followed by feeding p-xylene mixed with ⅖ of the total peracetic acid. The remaining ⅖ of peracetic acid was added after all of the xylene had been added to the reactor. Yields of terephthalic acid were better than if no initiator had been employed at all, but not so high as in Run 4 below. The reason is that only a portion of the peracetic acid—that added to the catalyst in a separate vessel in accordance with the process of the invention—was utilized at maximum effectiveness. The remainder—that portion fed directly into the hot rein the previous run and corresponded to a terephthalic acid to peracetic acid weight ratio of 9.5 to 1.

As can be seen by the above four runs it is necessary that the catalyst be activated in a separate vessel and fed into the reaction zone either as a separate stream or combined with the xylene feed just prior to its entry into the reaction zone.

If p-xylene is oxidized under the above-described conditions but without employing any means of catalyst activation at all, it is oxidized largely to p-toluic acid only; that is, the first methyl group of p-xylene can be oxidized without applying special activation techniques but the second methyl group cannot. Thus even Runs 2 and 3 above resulted in higher yields of terephthalic acid than if no catalyst activation had been employed. In the present art it is not known how to oxidize the methyl group of p-toluic acid employing ordinary liquid-phase oxidation catalysts without the use of activators or other special methods such as esterifying the carboxyl group prior to oxidizing the methyl group.

EXAMPLE II

A catalyst solution was prepared by dissolving 0.5 mole of cobalt acetate tetrahydrate in 1000 grams of glacial acetic acid slowly with continuous agitation at 60 to 70° C. After cooling to room temperature peracetic acid (0.25 mole in 27 to 29% acetic acid) was added dropwise with stirring and cooling. The temperature was maintained below 30° C. During the course of the addition of the peracetic acid the color of the solution changed from pink to a deep green characteristic of cobaltic ion in acetic acid media. The catalyst solution had a total cobalt content of 2.2% and a cobalt$^{+3}$/total cobalt ratio of 90 to 95%.

To the reactor containing the active catalyst (0.25 mole of cobalt catalyst activated with 0.125 mole of peracetic acid) was continuously fed a freshly mixed solution of p-xylene (2.5 mole) and active cobalt catalyst solution (0.25 mole cobalt activated with 0.125 mole peracetic acid). The average xylene feed rate was 2.21 grams per minute and the oxidation rate was $230 \times 10^{-4}$ mole of oxygen per liter per minute. The yields attained were:

|  | Percent |
|---|---|
| Terephthalic acid | 46.8 |
| p-toluic acid | 43.1 |
| Terephthalaldehydic acid | .2 |

The terephthalic acid/peracetic acid weight ratio was 10.2.

The actual oxidation was carried out, after addition of one-half the catalyst solution to the reactor, by introducing air into the agitated reaction zone at the rate of 0.2 to 0.3 cubic feet per minute. Xylene was charged in over a period of about ten minutes and the reactor brought rapidly to reaction temperature. Oxidation started at about 100° C. and became vigorous at about 130° C. More p-xylene and the second half of catalyst solution were fed continuously at a rate of 1.0 to 2.5 grams per minute into the reactor. The reactor temperature was maintained below 140° C. by carefully cooling the reactor with water fed to a coil in the reactor. Oxygen consumption by the reaction system was calculated from the amount of vent gas and its oxygen content. The pressure in the reactor was maintained at above 100 p.s.i.g. throughout the reaction. The total duration of the run was about 5 hours.

Additional runs were carried out using the procedure as outlined above and are described in Table II.

TABLE II

| | Run Number | | | | |
|---|---|---|---|---|---|
| | 1 | 2 | 3 | 4 | 5 |
| Reaction Sequence | Half of active catalyst in reactor. Xylene and other half fed at reactor temperature | Catalyst activated and 188 ml. water added, then run as preceding | Toluic acid and half of active catalyst in reactor, remaining half of catalyst fed at reaction temperture | Same as Preceding | Toluic acid and half of active catalyst in reactor; xylene and remaining catalyst fed at reactor temperature (1.48 g./min.) |
| Reagents: | | | | | |
| Acetic acid, g | 1,250 | 1,250 | 1,250 | 1,250 | 1,250 |
| Co(OAc)$_2$·4H$_2$O, g | 125 | 125 | 125 | 125 | 125 |
| p-Xylene, g | 265 | 256 | None | None | 133 |
| p-Toluic acid, g | None | None | 340 | 340 | 170 |
| AcOOH (27.9% in AcOH), g | 68 | 68 | 68 | 68 | 68 |
| Actual AcOOH, g | 19 | 19 | 19 | 19 | 19 |
| Reaction Conditions:[1] | | | | | |
| Air volume vented, cu. ft | 76.6 | 83.6 | 84.2 | 78.4 | 96.8 |
| Average flow vented, cu. ft./min | 0.255 | 0.279 | 0.280 | 0.262 | 0.328 |
| Total O$_2$ consumed, g | 173 | 149 | 96 | 86 | 137 |
| Theoretical O$_2$, g | 240 | 240 | 120 | 120 | 180 |
| Completion, percent | 72 | 62 | 80 | 71 | 76 |
| Rate of oxidation, mole O$_2$ min$^{-1}$ l$^{-1}\times 10^{-4}$: | | | | | |
| Active stage | 320 | 160 | 120 | 45 | 166 |
| After deactivation | 34 | 21 | 35 | | 23 |
| Products: | | | | | |
| Crude terephthalic acid, g | 202.6 | 94 | 195 | 88 | 242 |
| Acid number, mg. KOH/g | 660 | 661 | 653 | 655 | 656 |
| Calculated purity, percent | 93.3 | 95.3 | 91.3 | 92.3 | 93.4 |
| Calculated terephthalic, g | 193.5 | 97.6 | 185 | 87.2 | 233.7 |
| Yield of terephthalic, percent | 46.8 | 26.1 | 44.9 | 21.0 | 57.5 |
| Crude toluic acid, g | 144 | 171 | 167 | 190 | 119 |
| Acid number, mg. KOH/g | 408 | 403 | 403 | 400 | 428 |
| Calculated toluic, g | 144 | 158.2 | 156.3 | 182.3 | 116.8 |
| Toluic yield, percent | 43.1 | 51.5 | 46.0 | 53.9 | 35.0 |
| Terephthalaldehydic, g | 8.0 | 9.2 | 10.7 | 8.5 | 10.5 |
| Xylene recovered, g | 6.6 | 25.9 | | | 4.9 |
| Yield oxidation products, percent | 90.8 | 80.4 | 4.7 | 23.6 | 95.9 |
| Ratio of terephthalic:peracetic acid, g:g | 10.2:1 | 5.13:1 | 9.75:1 | 4.60:1 | 12.2:1 |

[1] All reactions at 135–140° C., 95–100 p.s.i.g. air, 5 hours.

In Run No. 2, Table II, 10 weight percent water based on the reactor charge was added initially to the reaction system. The reaction rate was about 30% lower than noted in Run No. 1 and a yield of terephthalic acid was only 26%.

In Run No. 3, Table II, p-toluic acid was used as the starting reactant. A 45% yield of terephthalic acid was attained at a lower rate than obtained when using xylene as the starting reactant. The above yield corresponded to a 9.7 to 1 terephthalic acid to peracetic acid weight ratio.

In Run No. 4, Table II, 0.5 mole cobalt was activated with 0.25 mole peracetic acid and half of the catalyst and 1.25 mole p-toluic acid was charged to the reactor. The remaining catalyst and 1.25 mole of xylene was fed simultaneously at a rate of 1.45 grams xylene per minute to the reactor. The oxidation rate was $166 \times 10^{-4}$ moles oxygen per liter per minute with the yield of terephthalic acid being 7.5%, p-toluic acid 35%, and terephthalaldehydic acid 1.8%. The terephthalic acid to peracetic acid ratio was 12.2.

EXAMPLE IV

Utilizing the procedure as described in the previous examples, further oxidations were carried out as shown by Table III and IIIa.

TABLE III

| | Run Number | | | | |
|---|---|---|---|---|---|
| | 1 | 2 | 3 | 4 | 5 |
| | (1) Mixed feeding xylene:toluic acid 61:39; (2) Toluic acid and half of catalyst soln were placed in reactor; (3) Xylene and catalyst soln. fed cont. by sep. pump. Average xylene feed rate, 1.10 g./min. | (1) Reactivated dry filtrate; (2) Half of reactivated catalyst was charged into reactor; (3) Xylene and half catalyst fed cont. by sep. pump. Average xylene rate, 1.70 g./min. | (1) High xylene conc.; (2) Half of catalyst placed in reactor; (3) Xylene and half of catalyst fed cont. by sep. pump. Average xylene rate, 2.10 g./min. | Mixed feeding xylene:toluic acid=25:75; Half of catalyst and toluic acid in reactor xylene and half of catalyst fed in cont. by sep. pump. Average xylene rate, 0.45 g./min. | High speed agitation (1,000 r.p.m.); Same as 3. Average feed rate, 1.80 g./min. |
| Charge: | | | | | |
| Acetic acid, g | 1,250 | (¹) | 900 | 1,250 | 900 |
| Co(Ac)₂ 4 H₂O, g | 125 | | 125 | 125 | 125 |
| Peracetic acid, percent: | | | | | |
| grams | 28.7 | 28.7 | 28.7 | 28.7 | 28.7 |
| grams | 19 | 14.8 | 19 | 19 | 19 |
| p-Xylene, g | 162 | 265 | 400 | 66.5 | 400 |
| p-Toluic acid, g | 133 | | | 256 | |
| Reaction Conditions: | | | | | |
| Reaction Temp., °C | 135–140 | 135–140 | 135–140 | 135–140 | 135–140 |
| Pressure, p.s.i.g | 95–100 | 95–100 | 95–100 | 95–100 | 95–100 |
| Reaction time, hrs | 5.0 | 5.0 | 5.0 | 5.0 | 4.0 |
| Air Vol. Vented, cu. ft | 91.1 | 94.3 | 95.5 | 97.4 | 75.2 |
| Lowest O₂ in Vent, percent | 13.3 | 10.0 | 10.5 | 15.8 | 9.5 |
| Avg. Air Flow, cu. ft./min | 0.303 | 0.314 | 0.318 | 0.325 | 0.312 |
| Total oxygen absorbed, g | 137 | 183 | 209 | 115 | 260 |
| Theo. oxygen required, g | 192 | 285 | 360 | 150 | 360 |
| Completion of oxidation, percent | 73 | 65 | 58 | 77 | 72 |
| Rate of Oxidation K×10⁻⁴ mole O₂ l⁻¹ min.⁻¹: | | | | | |
| For oxidation | 130 | 170 | 215 | 76 | 280 |
| For deactivation | 25 | 23 | 21 | | |
| Products: | | | | | |
| 1. Crude terephthalic acid, g | 255 | 259 | 345 | 260.4 | 289 |
| Acid number | 659 | 651 | 660 | 657 | 652 |
| Calc. purity, percent | 93.9 | 91.3 | 94.4 | 93.3 | 93.4 |
| Pure terephthalic acid, g | 240.9 | 241.7 | 330 | 246.3 | 272.5 |
| Yield of terephthalic acid, percent | 59.0 | 44.8 | 55.5 | 60.4 | 47.2 |
| 2. Crude p-toluic acid | (²) | 197 | 162 | 102 | 223 |
| Acid number | (²) | 418 | 418 | 421 | 416 |
| Total p-toluic acid, g | 118.9 | 202.0 | 161.1 | 106.6 | 222.5 |
| Yield of p-toluic acid, percent | 36.0 | 45.9 | 33.0 | 32.0 | 47.0 |
| 3. Terephthalaldehydic acid, g | 9.7 | 12.3 | 16.0 | 9.5 | 17.6 |
| p-Xylene recovered | 68 | 8.2 | 19.7 | 5.1 | 30.0 |
| Total Yield of Oxidation Products | 97.6 | 93.2 | 91.5 | 95.0 | 97.6 |
| Weight ratio TPA/AcOOH | 12.6 | 16.2 | 17.3 | 13.0 | 14.3 |

¹ Recycle dry filtrate 1,365 (aromatic 0.83 m.)(Co 1.88%).
² Filtrate was used for next experiment.

TABLE IIIa

| | Run Number 6 |
|---|---|
| | Batch, low Co⁺⁺⁺; Co⁺⁺⁺/total Co=0.56; Xylene, 25% of total wt.; Stirring, 1,000 r.p.m.; Xylene feeding, 1.63 g./min. |
| Reagents: | |
| Acetic acid, g | 900 |
| Co(AcO)₂ 4H₂O, g | 125 |
| p-Xyelne, g | 400 |
| 28.3% AcOOH, g | 40 |
| AcOOH, g | 11.4 |
| Xylene:peracetic acid, mole:mole | 24.8:1 |
| Reaction Conditions: | |
| Reaction temp., °C | 135–140 |
| Pressure, p.s.i.g | 95–100 |
| Reaction time, hours | 5.0 |
| Vent gases vol., cu. ft | 111 |
| Lowest O₂ in vent, percent | 10.7 |
| Average air flow, cu. ft./min | 0.370 |
| Total oxygen absorbed, g | 231 |
| Theoretical oxygen absorbed, g | 360 |
| Completion of oxidation, percent | 64.4 |
| Rate of oxidation×10⁻⁴ mole l⁻¹ min | 228 |
| Products: | |
| 1. Crude terephthalic acid, g | 287 |
| Acid number, percent | 609 |
| Calc. purity, percent | 87.3 |
| Total terephthalic acid, g | 251.3 |
| Yield of terephthalic acid, percent | 43.2 |
| 2. Crude p-toluic acid | 228 |
| Acid number, percent | 341 |
| Total p-toluic acid, g | 250.2 |
| Yield of p-toluic acid, percent | 52.5 |
| 3. Terephthalaldehydric acid, g | 13.5 |
| Yield of TALA, percent | 2.6 |
| p-Xylene recovered, g | 27.2 |
| Accountability of oxidation product, percent | 97.3 |
| Weight ratio, TPA/AcOOH | 22.0 |

Run No. 1, Table III, was carried out using a molar ratio of xylene to toluic acid of 61 to 39. To a stirred mixture of p-toluic acid (0.98 mole) and half of the cobalt catalyst (0.5 mole in 20.8 mole acetic acid, activated with 0.25 mole peracetic acid) was fed the remaining catalyst and 1.52 mole p-xylene separately and continuously. The average xylene feed rate was 1.10 grams per minute and the oxidation rate was $130 \times 10^{-4}$ oxygen per liter per minute. The yield of terephthalic acid was 59%. The filtrate after removal of the insoluble acid was used for Run No. 2, Table III. The yield of p-toluic acid was about 36% and the ratio of terephthalic acid to peracetic acid was 12.6 to 1.

Of the filtrate from Run No. 1, Table III, 1476.1 grams was distilled at approximately 125 mm. Hg through a 3 ft.×1″ Vigreux column. The complete distillate takeoff was incorporated and collected in the cooled receiver. The base temperature ranged from 67 to 72° C. and the overhead 62 to 65° C. A total of 922 grams of distillate was collected and the residue was dissolved in 720 grams of glacial acetic acid. Based on the cobalt content of the dissolved residue ($Co^{+2}=1.89\%$, $Co^{+3}=0.19\%$) the material was reactivated by adding 51.5 grams of 28.7% peracetic acid in acetic acid dropwise to give a theoretical amount of 100% $Co^{+3}$. The actual yield was 87.3% $Co^{+3}$.

To half of the reactivated dry filtrate from the previous run (1365 grams containing 0.83 mole aromatic compound, 1.88% $Co^{+2}$ activated with 51.5 grams of 28.7% peracetic acid in acetic acid) was fed the remainder of the catalyst and 2.65 moles p-xylene continuously by two separate metering pumps. The oxidation rate was $170 \times 10^{-4}$ moles oxygen per liter per minute. The yield of product was:

|   | Percent |
|---|---|
| Terephthalic acid | 44.8 |
| Terephthaladehydic acid | 2.5 |
| p-toluic acid | 45.9 |

The weight ratio of terephthalic acid to peracetic acid was 16.2.

Run No. 3, Table III, was carried out using 25 weight percent xylene in the total reaction mixture. To half of the activated cobalt catalyst and acetic acid (0.5 mole of cobalt acetate tetrahydrate in acetic acid activated with 0.25 mole peracetic acid) was added the remainder of the catalyst solution and 3.75 mole p-xylene continuously by separate pumps. The yield of oxidation product was:

|   | Percent |
|---|---|
| Terephthalic acid | 55.5 |
| Terephthaldehydic acid | 3.0 |
| p-toluic acid | 33.0 |

The weight ratio of terephthalic acid to peracetic acid was 17.3.

Run No. 4, Table III, was carried out with a feed of p-xylene and toluic acid in a mole fraction of 25 to 75. The weight ratio of terephthalic acid to peracetic acid was 13.0 for this run.

Run No. 5, Table III, was carried out under similar conditions as Run No. 3, Table III, except that a higher speed of agitation was employed (1000 r.p.m. instead of 700 r.p.m.) and a shorter reaction time was used (4 hours). The oxidation rate was approximately 30% higher than that of Run No. 3, the weight ratio of terephthalic acid to peracetic acid being 14.3., In Run No. 6, Table IIIa, a ratio of $Co^{+3}$ to total cobalt of about 0.5 to 0.6 was employed. To one half of the activated catalyst solution (total catalyst solution consisted of 900 grams of acetic acid, 0.5 mole cobalt acetate tetrahydrate activated with 0.15 mole of peracetic acid with a $Co^{+3}$ to total cobalt ratio of 0.56) in the reactor was charged the remainder of the catalyst solution and 3.75 mole p-xylene continuously by separate metering pumps at a rate of 1.63 grams of xylene per minute. The yields are noted in Table IIIa with the weight ratio of terephthalic acid to peracetic acid being 22 to 1.

EXAMPLE V

Table IV below presents the results of runs which were made employing a Type 316 stainless steel reactor having 4.2 liter capacity provided with mechanical agitation at 700 r.p.m. and fitted with cooling and heating devices and a receiver attached to a pressure filter. The reactor and the receiver were interconnected. Overflow to the latter kept the volume of liquid in the reactor at about 2 liters. The material in the receiver could be discharged intermittently to the filter where it was washed with hot acetic acid and pressured with air from a separate reservoir. Both xylene and catalyst were fed to the reactor at controlled rates through separate lines in such a fashion as to replenish the reactor product withdrawn. Residence time in the reactor was maintained at about 3 to 4 hours.

TABLE IV

|  | Run Number | |
|---|---|---|
|  | 1 | 2 |
|  | Cont., 10 hr.; Xylene, 20% of total wt.; Stirring, 700 r.p.m.; Xylene feeding, 1.73 g./min.; Catalyst feeding, 6.80 g./min. | Cont., 10 hr.; Xylene, 25-26%; Stirring, 700 r.p.m.; Xylene feeding, 2.05 g./min.; Catalyst feeding, 4.85 g./min. |
| Reagents: | | |
| Acetic acid, g | 1,920 | 3,150 |
| $Co(AcO)_2 H_2O$, g | 192 | 310 |
| p-Xylene, g | 570 | 1,200 |
| 28.3% AcOOH, g | 103 | 165 |
| AcOOH, g | 29.6 | 47 |
| Xylene: peracetic acid, mole:mole | 13.8:1 | 18.1:1 |
| Reaction Conditions: | | |
| Reaction temp., °C | 135-140 | 135-140 |
| Pressure, p.s.i.g | 95-100 | 95-100 |
| Reaction time, hours | 6.0 | 10.0 |
| Vent gases vol., cu. ft | 101.8 | 143 |
| Lowest $O_2$ in vent, percent | 8.5 | 9.8 |
| Average air flow, cu. ft./min | 0.283 | 0.227 |
| Total oxygen absorbed, g | 314 | 553 |
| Theoretical oxygen absorbed, g | 515 | 1,100 |
| Completion of oxidation, percent | 61.0 | 50.3 |
| Rate of Oxidation: $\times 10^{-4}$ mole $l^{-1}$ min | 153 | 163 |
| Products: | | |
| 1. Crude terephthalic acid, g | 442 | 899 |
| Acid number (TALA), percent | 617 | 654 |
| Calc. purity, percent | 78.4 | 94.0 |
| Total terephthalic acid, g | 346.4 | 845.7 |
| Yield of terephthalic acid, percent | 41.5 | 48.8 |
| 2. Crude p-toluic acid | 297 | 560 |
| Acid number, percent | 383 | 412 |
| Total p-toluic acid, g | 373.6 | 575.5 |
| Yield of p-toluic acid, percent | 53.8 | 40.5 |
| 3. Terephthalaldehydic acid, g | 19 | 37.8 |
| Yield of TALA, percent | 3.7 | 2.4 |
| p-Xylene recovered, g: | | |
| In trap | 26.7 | 15 |
| In reactor filtrate | 6.9 | 80 |
| Catalyst recovered | | (¹) |
| Accountability of oxidation product, percent | 98.0 | 91.7 |
| Weight ratio, TPA/AcOOH | 11.7 | 20.2 |

¹ Equiv. $Co(Ac)_2 4 H_2O$, 33.8; AcOOH, 5.1; Solution, 396 g., remained.

In Run No. 1, Table IV, a catalyst solution was prepared frim 19 to 20 grams of acetic acid, 0.77 moles of cobaltous acetate tetrahydrate and activated with 0.39 moles of peracetic acid. To 500 grams of this catalyst solution in the reactor xylene was charged continuously at a rate of 1.7 grams per minute. The remainder of the catalyst solution was fed into the reactor at a rate of 6.80 grams per minute. The oxidation rate was $153 \times 10^{-4}$ moles of oxygen per liter per minute. After 6 hours of continuous operation under the conditions set forth in Table IV, Run 1, the yield of product was:

|   | Percent |
|---|---|
| Terephthalic acid | 41.5 |
| p-Toluic acid | 53.8 |
| Terephthalaldehydic acid | 3.7 |

The weight ratio of terephthalic acid to peracetic acid was 11.7.

In Run No. 2, Table IV, a concentration of aromatics as xylene of 25 to 26% was maintained. A catalyst solution was prepared from 3,150 grams of acetic acid, 1.24 moles cobaltous acetate tetrahydrate activated with 0.62 mole peracetic acid. To 500 grams of this catalyst solution in the reactor p-xylene was charged continuously at the rate of 2.05 grams per minute. After the second hour of operation the remainder of the catalyst solution was introduced at the rate of 4.85 grams per minute.

The reactor filtrate free from terephthalic acid, together with the liquid resulting from washing out the reactor, was transferred to a 3 liter round bottom flask to give a total net weight of 2453 grams, and this mixture was distilled through a 3'×1" Vigreux column at a pressure of 125 mm. Hg. The complete takeoff was incorporated and the distillate collected in a cooled receiver. The base temperature ranged between 67 and 72° C. and the overhead at 62–65° C. A total of 1345 grams of distillate was collected and the residue dissolved in 1213 grams of glacial acetic acid. The reactivated filtrate of Run No. 2 after the removal of terephthalic acid, water, and xylene, was used with the fresh catalyst and recycled to the reaction zone. Results are shown in Table IV.

The embodiments of the invention in which an exclusive property or privilege is claimed are defined as follows:

1. A continuous process for the preparation of aromatic dicarboxylic acids which comprises
   (a) treating in a reactivation zone a catalyst solution made of from about 0.5 weight percent, calculated as cobalt, up to saturation concentration of a cobalt compound in a lower aliphatic monocarboxylic acid having from 2 to 8 carbon atoms with peracetic acid dissolved in acetic acid at about 0° C. to 40° C. to form an activated catalyst solution,
   (b) introducing simultaneously into a reaction zone maintained at 130–140° C. said activated catalyst solution, an alkyl disubstituted aromatic compound, and molecular oxygen,
   (c) removing a reaction mixture from said reaction zone and separating therefrom crude aromatic dicarboxylic acid as well as substantially all the water and unreacted alkyl disubstituted aromatic compound so as to obtain a catalyst solution,
   (d) passing the catalyst solution thus obtained to said reactivation zone.

2. The process of claim 1 wherein the activated catalyst solution is mixed with the alkyl disubstituted aromatic compound just prior to its entry into the reaction zone.

3. The process of claim 1 wherein said alkyl disubstituted aromatic compound is p-xylene, wherein said aromatic dicarboxylic acid is terephthalic acid, wherein said cobalt compound is cobalt acetate and wherein said lower aliphatic monocarboxylic acid is acetic acid.

4. The process of claim 3 wherein the reagents fed to the reaction zone comprise from about 10–30 percent by weight of p-xylene, 60–80 percent by weight acetic acid, and not more than 10 percent by weight water.

References Cited

UNITED STATES PATENTS

| | | | |
|---|---|---|---|
| 2,245,528 | 6/1951 | Loder | 260—524 |
| 2,367,501 | 1/1945 | Hull et al. | 252—431 |
| 2,497,889 | 2/1950 | Hull | 252—431 |
| 2,727,921 | 12/1955 | Taves | 260—524 |
| 3,036,122 | 5/1962 | Ardis et al. | 260—524 |

LORRAINE A. WEINBERGER, Primary Examiner

R. S. WEISSBERG, Assistant Examiner